United States Patent [19]

Breckenridge

[11] Patent Number: 4,549,573
[45] Date of Patent: Oct. 29, 1985

[54] SPRAY VALVE ASSEMBLY

[76] Inventor: Gerald H. Breckenridge, Rte. 1, Box 169, McCrory, Ark. 72101

[21] Appl. No.: 587,818

[22] Filed: Mar. 9, 1984

[51] Int. Cl.⁴ ............................................. F16K 17/04
[52] U.S. Cl. .................................. 137/495; 137/510; 251/83; 251/100
[58] Field of Search ............... 137/495, 509, 510, 523; 251/83, 100

[56]           References Cited
           U.S. PATENT DOCUMENTS

| 1,198,956 | 9/1916 | Richardson | 137/523 UX |
| 1,493,774 | 5/1924 | Dorsey | 137/510 X |
| 2,043,798 | 6/1936 | Hyatt | 137/510 X |
| 2,639,194 | 5/1953 | Wahlin | 137/510 X |

FOREIGN PATENT DOCUMENTS

| 729707 | 7/1932 | France | 137/510 |
| 322993 | 12/1929 | United Kingdom | 137/510 |

Primary Examiner—Robert G. Nilson
Attorney, Agent, or Firm—Stephen D. Carver

[57]             ABSTRACT

A spray valve assembly adapted to be removably, threadably secured to spray boom manifolds or the like for subsequent spraying of insecticides or other agrichemicals. Preferably the spray valve assembly includes a rigid valve body adapted to be threadably secured to a suitable spray boom or manifold; and a cooperating valve head which is threadably secured to the valve body. A generally tubular fluid admittance passageway coaxially, sealably defined within the valve body extends partially into the valve assembly, and terminates in the assembly spray output. A plunger associated with the valve head includes a ram portion which contacts an internal gasket to selectively block the admittance input to prevent escape of agrichemicals. The plunger means also includes an elongated stem coaxially received through the valve head which is fitted with a transverse pin which normally tracks within a suitable follower slot defined in the head. The slot includes both horizontal and vertical portions, and when the pin is disposed within the horizontal follower portion input pressure to the spray valve assembly against yieldable bias from the plunger will admit fluid into the admittance passageway thus bypassing the gasket for expulsion through the assembly outlet. The plunger may be locked in either a totally open position, a totally closed position, or an operative position wherein the stem is free to move axially relative to the assembly in response to fluid input pressure.

4 Claims, 9 Drawing Figures

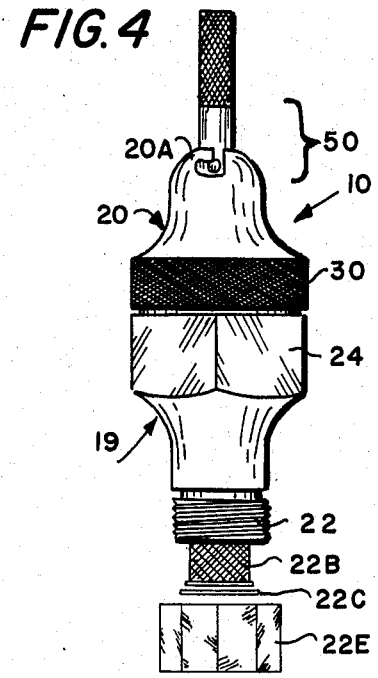
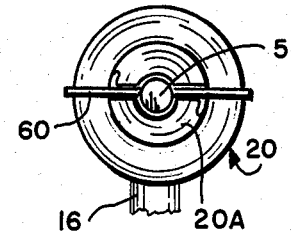
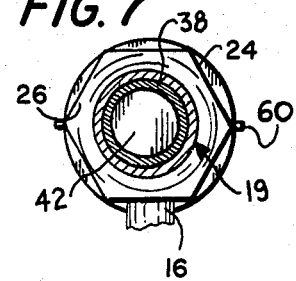
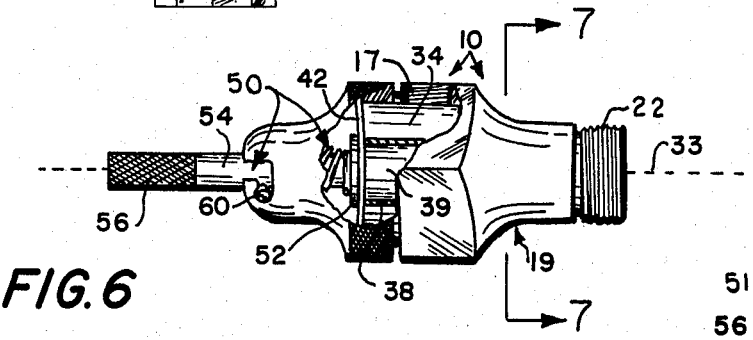
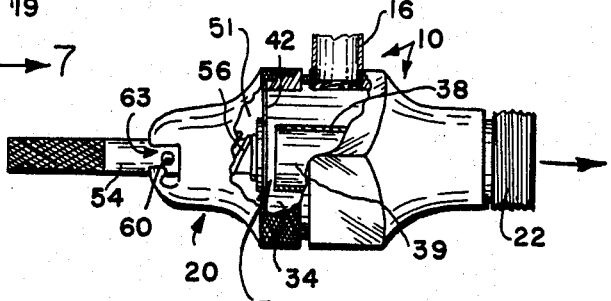
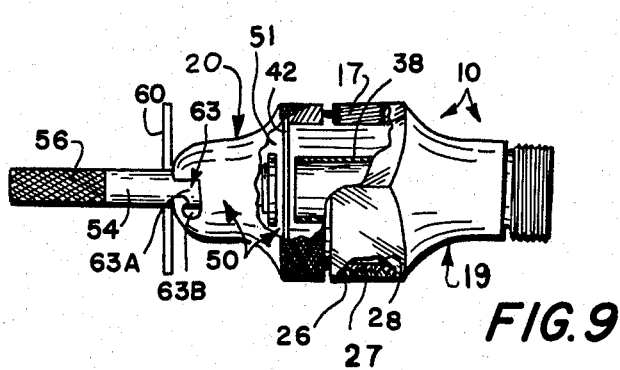

SPRAY VALVE ASSEMBLY

BACKGROUND OF THE INVENTION

The present invention relates generally to aviation agrichemical application. More particularly the present invention relates to a low-cost, high efficiency, replacement type aircraft spray boom valve assembly.

Spray booms or manifolds of the type contemplated by the present invention are usually secured to the wings of the airplane through a variety of mounting systems. Such mounting systems may include clamps of the type disclosed in my co-pending patent application, Ser. No. 310,463 now U.S. Pat. No. 4,445,657 Filed 10/31/81, and entitled Spray Boom Mounting Assembly. As will be appreciated by those skilled in the art, the various forms of hardware including manifolds, fluid lines, spray booms, valves, nozzles and the like used in conjunction with airborne agri-chemical application generates an extreme variety of mechanical and chemical stresses. Due to the corrosive chemicals involved, rapid deterioration of metal parts may occur and such deterioration is particularly deleterious in conjunction with the spray nozzles through which agrichemicals must be outputted for application.

Due to a variety of Federal regulations, including EPA regulations and rules, for example, pesticides, insecticides and other agri-chemicals must be handled and/or applied according to various detailed and vexatious procedures.

It therefore may be important that a spray system used in conjunction with airborne spray booms, for example, be readily locked to a fail-safe position under certain circumstances. By way of example, such a circumstance includes the long-distance travel of a crop-duster plane to a remote job site etc. It is very important that no pesticides or the like be inadvertently dropped upon unintended areas. Moreover, because of the corrosive nature of typical agri-chemicals, and their negative effects upon metallic components, equipment employed in conjunction with agrichemical application must be thoroughly cleaned and rinsed after an opertion. Cleaning is necessary to prevent subsequent chemical reactions from degrading or oxidizing critical working parts. It is important to wash away residue of various chemicals to prevent jamming of critical moving parts.

A variety of prior art spray boom ejector valves may be releasably fitted to spray booms, manifolds or the like. Conventionally, pressure applied to the spray boom deflects internal valve systems to eject fluid when desired. Then, when spraying is discontinued, collapsing internal pressure results in automatic sealing of the spray valve in response to a plunger which closes a suitable internal orifice. Usually some form of sealing gasket is employed therewithin.

Most importantly, prior to the application operation the output rate of the spray boom usually must be selected for the desired job and then appropriately adjusted. Conventional spray booms typically may employ between eight to thirty ejector nozzles per boom, and of course one boom is associated with each airplane wing. Conventionally a plurality of nozzles may be manually removed and plugged with the use of common hand tools such as wrenches and the like to vary application flow rates. Alternatively a series connected valve may be coupled in line with each of the ejector nozzle pipes, and subsequent adjustment of such valves may vary the application rate. Where flow rate is selected by removing (or adding) nozzles, a great deal of valuable time is consumed.

Where conventional, manually adjustable in-line valves are used for flow rate control operational reliability is decreased, and aerodynamic drag may be disadvantageously increased to the detriment of fuel economy and flight characteristics of the airplane. In-line valves may also suffer from dissimilar metal reactions resulting in degradation of structural integrity. This is virtually insured by chemical reaction with the fluids passed through the valves. In order to clean such systems high pressure water must be applied therethrough, and residue and build-up of unwanted chemical residue is an inevitable consequence. Usually total cleaning requires the total removal of the valve. Repeated tightening and loosening of threaded metallic fittings, as will be appreciated by those skilled in the art, often leads to mechanical failure. For example, virtually inevitably some threaded orifice on the spray boom assembly will become "stripped" and concomitant possibly environmentally degrading leakage will almost inevitably occur.

Hence it is my opinion that a valve assembly which may be quick-fitted to existing spray booms, manifolds and the like, and which may be quickly manually flipped between desired operative positions without the use of hand tools is advantageous and necessary.

SUMMARY OF THE INVENTION

The present invention comprises a spray valve assembly which may be secured to spray boom assemblies, manifolds, or other airborne pressurized sources of agrichemicals.

The present spray valve assembly contemplates two major parts which are threadably secured together. A rigid, generally tubular valve body includes a first, preferably externally threaded output end adapted to be conventionally secured to an external spray fitting for ultimately outputting agrichemicals. An internal, rigid, generally tubular fluid admittance chamber having an internal input end is coaxially secured internally of the assembly and is in fluid-flow communication with the assembly output end. An assembly inlet admits fluid interiorly of the valve assembly, and is adapted to be coupled to the spray boom manifold with which the valve assembly is operationally associated. The valve body is preferably threadably secured to a cooperating, axially aligned valve head which effectuates fluid flow control.

Internal plunger means associated with the valve head is axially moveable with respect thereto, and the plunger means terminates in a ram sealably disposed interiorly within the valve assembly. An internal gasket disposed between the ram and the admittance chamber input end may be forced against the admittance chamber to prevent the flow of fluid therethrough. Preferably the plunger means includes an elongated stem axially, sealably penetrating the valve head, and normally axially displaceable with respect thereto. This stem controls the ram means for ultimately opening or closing the internal admittance chamber. Preferably the plunger stem includes a transverse pin which is fitted through and tracked within a follower slot defined within the valve head. In this manner three operative positions of the present valve assembly are facilitated.

First, in the operationally active position, the pin will track within the elongated, generally horizontal follower slot portion, and in this mode incoming pressure of agri-chemicals will yieldably deflect the gasket and the ram against predetermined pressure from a captured, internal spring to admit fluid to the admittance means, which fluid will thus pass through the admittance means and out of the valve assembly through a suitable check-valve-equipped nozzle of conventional construction which will be mechanically coupled to the assembly by the operator.

A second important operative position is facilitated by a generally transverse follower slot portion. In this case, manual torsional displacement of the plunger stem will lock the pin within the tracking transverse follower section, semi-permanently blocking the admittance means by forcing the ram, and thus the gasket, against the admittance means inlet. This position is ideal for reducing application rates of the boom. Moreover, unwanted leakage will be virtually eliminated.

In the third position facilitated by the present construction, the pin means is manually withdrawn from the follower slot, which follower slot is "open" to permit withdrawal of the pin by axial manual manipulation of the plunger stem, and then subsequent twisting will position of the plunger in a "totally open" position. In other words, the internal spring will urge the pin against the outer, non-slotted portion of the valve head to maintain the valve assembly open. In this case, high pressure cleaning fluid such as water or the like inputted to the assembly will rush by the gasket through the assembly via the admittance chamber thereby cleaning the entire assembly and the output hardware and fittings attached thereto.

Thus a broad object of the present invention is to provide an improved spray valve assembly for conventional agri-chemical aviation spray booms, manifolds and the like.

A similar object of the present invention is to provide a reliable spray boom or manifold valve system which may be manually moved between locked, cleaning, and operational positions.

Yet another object of the present invention is to reduce labor normally required to comply with EPA regulations and the like.

Yet another object of the present invention is to extend the lifetime of agri-chemical aviation spray equipment by greatly facilitating the ease and speed with which such equipment may be cleaned.

A still further object of the present invention is to provide a valve assembly of the character described which may be retrofitted to existing spray boom manifolds and the like.

Yet another object of the present invention is to provide valve assembly mechanisms of the character described, which are areodynamically configured in accordance with modern design technology.

A still further object of the present invention is to greatly reduce chemical deterioration caused by chemical corrosion or dissimilar-metal reactions and the like.

Another important object of the present invention is to facilitate quick and easy manual adjustment to boom output flow rates.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 4 is a side view taken generally from the right of FIG. 2;

FIG. 5 is a top plan view of my new valve assembly;

FIG. 6 is a fragmentary, longitudinal sectional view illustrating the valve assembly in a totally locked position;

FIG. 7 is a fragmentary, axial sectional view taken generally along line 7—7 of Figure in the direction of the arrows;

FIG. 8 is a fragmentary, longitudinal sectional view of the valve assembly illustrating it in an operationally active position; and, FIG. 9 is a fragmentary, longitudinal sectional view illustrating the valve assembly in a totally open position.

DETAILED DESCRIPTION OF THE DRAWINGS

Figure 1:
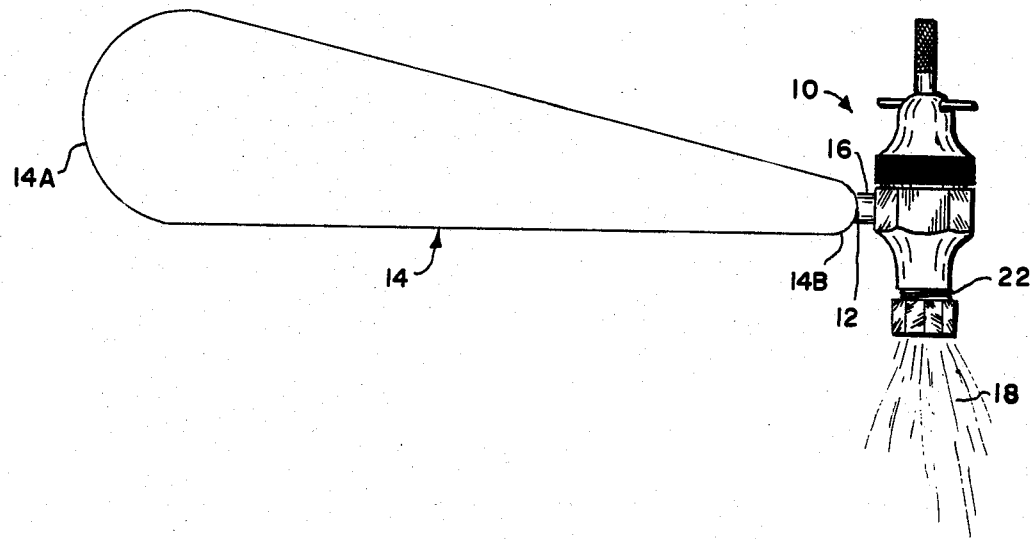
FIG. 1 is a fragmentary, isometric view illustrating the assembled valve assembly constructed in accordance with the teachings of the present invention.
Figure 2:
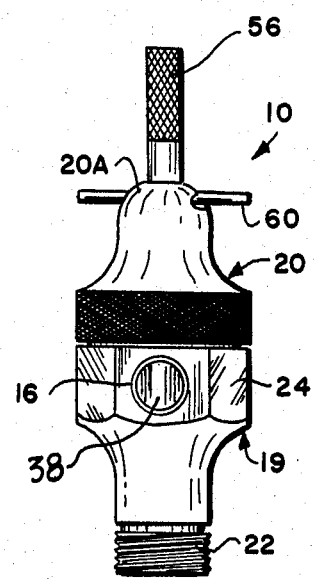
FIG. 2 is an enlarged side view of the valve assembly, taken generally from a position immediately to the left of the valve assembly shown in FIG. 1.
Figure 3:
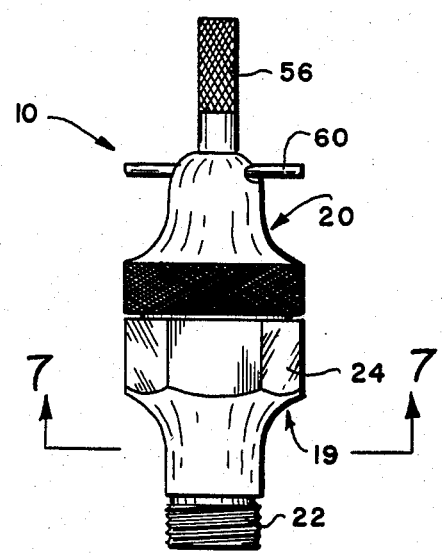
FIG. 3 is a view of the opposite side from that of FIG. 2.

With initial reference now to FIG. 1, a spray valve assembly constructed in accordance with the preferred mode teachings of the present invention has been generally designated by the reference numeral 10. As illustrated, valve 10 is adapted to be threadably secured to a suitable fitting 12 defined within a conventional manifold 14 or the like via an appropriate, conventional tubular threaded fitting 16. It will be understood that manifold 14 will be secured to the wing of an agri-chemical applicator airplane through one of a variety of different techniques, and the hollow interior of the manifold 14 will thus be full of pressurized fluid. In normal operation, high pressure fluid delivered interiorly of valve assembly 10 via fitting 16 will be outputted therefrom through threaded output end 22 which is in fluid flow communication with the valve assembly interior. Conventional spray restriction nozzle apparatus fitted to end 22 comprises a threaded element 22E (FIG. 4) which mounts a flow restrictor 22C against an interiorly secured generally tubular filter element 22B. Normal operation will thus result in the output of a fine mist 18 (FIG. 1) of the agri-chemical to be ultimately applied.

With reference now to FIGS. 2-9, the valve assembly 10 includes a rigid, generally tubular valve body, generally designated by the reference numeral 19, and a cooperating valve head generally designated by the reference numeral 20. As best viewed in FIG. 6, the valve body 19 includes a peripheral, interiorly threaded orifice 17 which is in fluid flow communication with the valve body interior. Orifice 17 is adapted to threadably receive tubular mounting fitting 16 which is in turn coupled to the manifold 14 to operationally mount the assembly 10. The valve body 19 diverges from end 22 toward a larger-diameter, integral, generally hexagonal region 24 whose radial, generally circular internal profile 26 (FIG. 9) is internally threaded. Head 20 includes externally threaded tubular end 27 (FIG. 9) which mates to the threaded portion 26 of valve body 19. When head 20 is thus threadably secured to body 19, the inner volume 34 of the valve assembly 10 will be substantially sealed.

The valve body 19 includes a rigid, generally tubular fluid admittance passageway 38 which extends into the interior 34 of the valve assembly, and which is generally coaxially positioned relative to both the valve body and the valve head. The axis of the valve assembly illustrated by dashed lines in FIG. 6 has been generally designated by the reference numeral 33. It will be appreciated that the tubular admittance means 38 includes an internal hollow cavity 39, which is in fluid flow communication with the threaded body end 22. Ordinarily, during operational activity of the valve assembly, as will hereinafter be described in detail, fluid forced into passageway 17 will deflect the gasket 42 to enter the admittance means interior 39 through entrance 39A and will be outputted as mist 18 (FIG. 1). Internal volume or region 34 will thus be selectively placed in fluid flow communication with admittance means interior region 39 by the action of gasket 42.

The resilient generally circular gasket 42 is sealably disposed internally of the valve assembly between valve body 19 and head 20 dividing region 34 from adjacent hollow head region 51. The center portion of gasket 42 may be forceably pushed towards the admittance means entrance 39A to block the admittance chamber 39, or it may yieldably occlude it to allow normal operational agri-chemical ejection. Importantly, the valve head includes plunger means generally designated by the reference numeral 50. The plunger means includes a ram 52 coupled to an elongated stem 54 coaxial with valve axis 33. Stem 54 is normally axially displaceable with respect to the valve head within which it is captured. A conventional, internal spring 56 captured within the valve assembly normally biases the plunger ram 52 towards gasket 42 to block passageway 39. However, stem 54 may be displaced axially to "unblock" admittance means 38 to allow the escape of fluid from internal region 34 into passageway 39 permitting fluid escape from assembly 10 and the generation of mist 18 as previously described. Manual manipulation of the plunger means is facilitated by the knurled section 56 at the end of stem 54.

Transverse pin 60 penetrates the stem 54, and the pin 60 is maintained in operational relationship by a conventional friction fit. This pin ordinarily tracks within a follower slot, generally designated by the reference numeral 63. Follower slot 63 includes a general horizontal portion 63A which communicates with a generally transverse portion 63B.

FIG. 6 illustrates the valve assembly disposed in a "totally locked" position. In this case, it will be apparent that stem 54 has been forced inwardly of the valve assembly, moving the ram 52 into forceable engagement with gasket 42 thereby closing admittance passageway 39. In this case manual torsional displacement of stem 54 will position pin means 60 within the follower slot transverse portion 63B, so that subsequent manual release of the plunger means maintains the apparatus in the closed position (FIG. 6). Normal operation of the device is facilitated by manually twisting the plunger means from the position illustrated in FIG. 6 to the operative position illustrated in FIG. 8. In this instance it will be apparent that pin 60 is free to move within the follower slot 63, so that the plunger assembly may move axially relative to the head 20, and ram 52/gasket 42 will variably block or unblock admittance passageway 39. In other words, depending upon the pressure of fluid entering body orifice 17 and thus appearing within interior 34, gasket 42 may or may not be yieldably displaced to expose passageway 39. When sufficient operative pressure is generated, gasket 42 will be moved from its former seating position against inlet 39A, facilitating passage of the fluid through passageway 39 and out of the valve assembly end 22.

After a desired spraying operation has been completed the valve hardware must normally be cleaned. In this case, manifold and storage tanks may be subjected to normal tap water pressure. Such water pressure may or may not be sufficient to deflect the plunger assembly and the internal gasket to unblock the admittance passageway 39. Thus, with reference to FIG. 9, the follower slot 63 is "open" and the stem 54 of the plunger assembly may be withdrawn axially by manual manipulation until the pin 60 escapes from follower slot 63. In this case, subsequent ninety degree rotation of the plunger assembly will position pin 60 such that it will not enter the follower slot upon subsequent stem release, but instead will be biased against outermost end 20A (FIG. 2) of the valve head 20. Therefore during the cleaning operation, internal spring 56 will bias pin 60 against the outermost end 20A of the valve head maintaining gasket 42 in spaced relation relative to the operative admittance passageway 39. In this case relatively low pressure water entering the valve assembly will have an unobstructed passageway through the output end 22, and cleaning and removal of residue will be facilitated. Importantly, I have found that when the valve assembly is maintained in this "totally open" position, the passage of a relatively large volume of cleaning water through the entire spray boom assembly and hardware greatly maintains the life of all operative parts, and thoroughly facilitates the ejection of unwanted residue and the like.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A spray valve assembly adapted to be coupled to an aircraft spray boom, spray manifold or other pressurized source of agri-chemical fluids to be sprayed, the spray valve assembly comprising:

rigid, generally tubular valve body means comprising an output end adapted to be coupled to a conventional spray fitting, spray nozzle or the like, said body means also comprising an inner volume and a spaced apart threaded coupling end, said valve body being of a preselected length and having a longitudinal axis;

input passageway means for admitting said agri-chemicals to be sprayed interiorly of said inner volume of said body means;

generally tubular fluid admittance means in fluid flow communication with said valve body output end and coaxially secured relative to said axis, said admittance means having an input;

valve head means adapted to be secured to said spaced apart threaded coupling of said valve body in axial alignment with said admittance means, said head means sealably confining fluid interiorly of said spray valve assembly;

plunger means normally biased toward said admittance means input, said plunger means comprising ram means and elongated stem means for controlling said ram means, said stem means and said ram means controlled thereby being axially moveable with respect to said valve head means;

internal gasket means for selectively blocking and unblocking said admittance means input in response to said plunger ram means whereby to control passage of agrichemical fluid through said admittance means;

pin means penetrating said plunger stem means for selectively disposing said assembly in a desired functional position; and, said valve head means including follower slot means for trackably receiving said pin means, said follower slot means including a first portion generally parallel with said axis and permitting axial displacements of said plunger means whereby to facilitate active operation of said assembly, and an inner, generally transverse locking portion in which said pin means may be temporarily positioned in response to twisting of said plunger stem means whereby to yieldably lock said assembly in a totally locked position by maintaining said ram means in sealing engagement with said gasket means against said admittance means input.

2. The spray valve assembly as defined in claim 1 wherein said first portion of said follower slot means is open ended whereby to selectively permit total escape of said pin means from said follower slot means in response to displacement of said plunger means by proper manual manipulation of said stem means, whereupon said pin means will maintain said assembly in a totally open position if said plunger means stem is suitably twisted and then released after said pin means escapes from said slot means.

3. A spray valve assembly adapted to be coupled to an aircraft spray boom, spray manifold or other pressurized source of agrichemical fluids to be sprayed, the spray valve assembly comprising:

rigid, generally tubular valve body means comprising a output end adapted to be coupled to a conventional spray fitting, spray nozzle or the like, said body means also comprising an inner volume and a spaced apart coupling end, said valve body being of a preselected length and having a longitudinal axis;

input passageway means for admitting said agrichemicals to be sprayed interiorly of said inner volume of said body means;

generally tubular fluid admittance means in fluid flow communication with said valve body output end and coaxilly secured relative to said axis, said admittance means having an input;

valve head means adapted to be secured to said spaced apart coupling end of said valve body in axial alignment with said admittance means, said head means sealably confining fluid interiorly of said spray valve assembly;

plunger means normally biased toward said admittance means input, said plunger means comprising ram means and elongated stem means for controlling said ram means, said stem means and said ram means controlled thereby being axially moveable with respect to said valve head means;

internal gasket means for selectively blocking and unblocking said admittance means input in response to said plunger ram means whereby to control passage of agrichemical fluid through said admittance means;

pin means penetrating said plunger stem means for selectively disposing said assembly in a desired functional position; and, said valve head means including follower slot means for trackably receiving said pin means, said follower slot means including a first portion generally parallel with said axis and permitting operationally active axial displacements of said plunger means, and an inner, generally transverse locking portion in which said pin means may be temporarily positioned in response to twisting of said plunger stem means whereby to yieldably lock said assembly in said totally locked position by maintaining said ram means in sealing engagement with said gasket means against said admittance means input.

4. The spray valve assembly as defined in claim 3 wherein said first portion of said follower slot means is open ended whereby to selectively permit total escape of said pin means from said follower slot means in response to displacement of said plunger means by proper manual manipulation of said stem means, whereupon said pin means will maintain said assembly in a totally open position if said plunger means stem is suitably twisted and then released after said pin means escape from said slot means.

* * * * *